Patented Apr. 18, 1939

2,154,541

UNITED STATES PATENT OFFICE 2,154,541

RESIN MANUFACTURE

Leslie T. Sutherland, Yonkers, N. Y., assignor to The Barrett Company, New York, N. Y., a corporation of New Jersey No Drawing. Application April 6, 1936, Serial No. 72,981

11 Claims. (Cl. 260—57)

This invention relates to the preparation of phenolic resins of the phenol-formaldehyde condensation type. More particularly it is directed to the production of colorless or only slightly colored casting resins from which various products possessing a highly attractive appearance may be obtained.

Phenolic condensation products to be of commercial value for casting purposes should be tough, non-friable, resistant to warping and, during the final curing process, should not be subject to bubble formation nor to material shrinkage.

Although the homologues of phenol, for instance the cresols, had been used in the preparation of dark colored types of molding resins, prior to the present invention it was considered that these phenols were unsuitable for the preparation of products of the transparent or translucent type capable of being cast. The homologues of phenol or mixtures containing them, for example, mixtures of the cresols or of phenol with cresols, when used for the preparation of the ornamental type of cast condensation products, yielded materials showing a high degree of shrinkage and a particularly excessive brittleness. The products were never clear and frequently possessed bubbles and similar faults. Moreover, they were frequently of dark shades having a relatively limited application. These defects in the resins prepared from homologues of phenol have discouraged their use for preparation of ornamental cast resin products.

The destructive distillation of coal yields large quantities of phenolic products but these products contain cresols and xylenols in addition to phenol, and the commercial separation of these phenols adds materially to the cost of the purified phenol from this source. The cresols and xylenols from such a separation furthermore have represented a commercial loss in so far as use in the casting resin field is concerned.

In accordance with the process of the present invention, the homologues of phenol or mixtures containing them are employed under specific reaction conditions whereby products equal in quality to those obtained from U. S. P. phenol are produced. My process is particularly concerned with the employment of phenols of the types derived from coal tar, such as the cresols or the xylenols, or mixtures thereof with phenol, for this purpose. Thus my process makes feasible the production of ornamental casting resins from lower cost initial materials than have heretofore been found practicable. Cresols and xylenols recovered from coal tar normally contain color-producing impurities, possibly compounds possessing a quinonoid structure such that upon oxidation colored materials are produced. The elimination of these materials from the phenols should, of course, be effected prior to their use for the production of colorless products. Purification processes effective for this purpose are known and hence do not constitute a part of the present invention.

It has been found that ortho-cresol tends to yield resins of less satisfactory color than the other higher phenols and accordingly it is preferred to eliminate this material if it happens to be present. In view of the appreciable difference in boiling points of ortho-cresol and the meta and para isomers, this separation does not present great difficulty and may be effected by fractional distillation.

In the present process a homologue of phenol is condensed with formaldehyde in a ratio of at least 2 and preferably 3 mols of the formaldehyde for each mol of the homologue. The condensation is effected in two stages, the first stage being carried out in the presence of a small percentage of sodium hydroxide serving as a catalyst.

If the same reaction conditions are employed in the condensation of the higher homologues of phenol as are employed for phenol itself, the initial condensation produces a brittle product which, I have found, contains an excessive quantity of water. The product is quite unsuitable for the customary uses of the corresponding phenol condensation product. If the reaction temperature is reduced so as to avoid the production of a brittle resin, the resin will contain still greater quantities of water, and while the condensation may be so regulated that the product can be poured into molds and cured, the curing yields a shrunken product that may be non-transparent and suffused with bubbles. Again the end product is not comparable to that prepared from phenol.

I have found that the above difficulties in the use of the homologues of phenol result to some extent from the improper elimination of water during the first condensation stage or thereafter. The reason for this appears to lie in part in the rate of condensation of these compounds, which does not permit a proper elimination of the water formed in the reaction. The products of the first condensation step, as compared with phenol-formaldehyde resins of the same degree of condensation are much more viscous and it seems impossible to eliminate the water without rendering the products too viscous for casting.

In the process of the present invention these difficulties are avoided by use of an amount of alkaline catalyst very materially below that which is normally employed with phenol. An alkali-metal hydroxide amounting to around 3% or 4% (or even more) by weight of the phenol is usually employed. However, to secure satisfactory results with the homologues of phenol, I have found that not more than 2% by weight of alkali-metal hydroxide based on the weight of the homologue should be employed. Preferably a much smaller proportion is employed, on the order of 0.1% to 0.3% or less. The percentage of alkaline catalyst employed may vary depending upon the homologue used; thus a smaller proportion may be used with xylenol than is used with the cresols. The smaller proportions of catalysts employed in accordance with the present invention result in an alteration of the reaction such that it may be readily controlled to produce an intermediate fusible resin product having sufficiently low viscosity to permit the removal of water and to yield a water-free fusible resin suitable for casting into strong non-friable resins of excellent color.

Phenolic products suitable for the preparation of ornamental casting resins having very good properties may be prepared from cresols and xylenols of coal tar origin purified by fractional distillation until close boiling fractions of the following types are obtained:

1. A cresol fraction having an initial boiling temperature of 201° to 202° C. and a boiling range of not more than 3° C. with at least 90% distilling within a 1° C. temperature range. This fraction will normally contain meta- and para-cresols in various ratios. It will be substantially free from ortho-cresol.

2. A cresol fraction of slightly broader boiling range than Type 1 may be used where products of less clarity or whiteness are satisfactory or where phenol is to be mixed with cresols prior to condensation. Thus a product boiling initially at 201° to 202° C., having a boiling range of not over 5° C., and at least 90% of which distills off in a 3° range, may be used to advantage for mixing with an equimolar quantity of phenol; the quantity of phenol may be reduced with equally good results as the boiling range of the cresol fraction approaches that of Type 1.

3. A phenolic fraction having a boiling range of 210° to 213° C. which will consist mainly of 1,4,2-xylenol (2,5-dimethylphenol).

4. A phenolic fraction having a boiling range of 217° to 219° C., which will consist mainly of 1,3,5-xylenol (3,5-dimethylphenol).

5. Mixtures of the above fractions or phenolic distillates of similar composition may also be used; for example a fraction boiling in the range 201° C. to 220° C. may be employed.

It will be readily understood that directly recovered fractions of such a broad boiling range may be subject to variation of individual constituents and since the most satisfactory conditions of condensation differ for the various constituents, the results may be less uniform when such fractions are employed than when fractions such as Types 1 to 4 above, or mixtures of these in definite proportions, are employed.

The process of the present invention may be varied considerably as illustrated below. The first step, involving condensation with sodium hydroxide, may be carried out at temperatures ranging from 60° up to 100° C. With a mixture of meta- and para-cresol at temperatures in the neighborhood of 60° C. as high as 2% by weight of sodium hydroxide may be employed as catalyst. If the reaction is carried out at a temperature in the neighborhood of 100° C., it is preferable to employ amounts of sodium hydroxide of the order of 0.3% or less.

With 1,3,5-xylenol the quantity of sodium hydroxide employed as catalyst advantageously may be much less than that most suitable for the meta-, para-cresol mixture at the same reaction temperature and the reaction may even be carried out to advantage without any of the condensation agent. If mixtures of cresols and xylenols are employed, the quantity of catalyst may be arranged to meet these conditions. If phenol is present in substantial quantities, the percentage of sodium hydroxide preferably is raised toward the maximum of 2%.

The elimination of water may be effected either during or after the initial condensation stage or partly during and partly after this stage. After the initial condensation step sodium hydroxide is neutralized, for example by an organic acid such as tartaric acid or lactic acid. Preferably water is evaported after this neutralization until the fusible resin product contains not more than about 10% of water. Dyes, pigments, and/or plasticizers may be added prior to, during, or after neutralization and evaporation. When a plasticizer is employed, the amount thereof may vary in accordance with accepted practice, for example, from 2% to 20% of glycerine may be employed depending upon the flexibility desired in the final product.

After evaporation of water and neutralization and after the addition of dyes, pigments, plasticizers, etc., when these are employed, the fusible resin is poured into a mold and heated at a temperature around 65° to 100° C. until it is hard.

The extent of condensation during the initial condensation stage may be determined by withdrawing samples from the batch and noting their appearance when cooled to room temperature. If the sample separates into two layers at room temperature, the initial condensation is nearly complete. The reaction is continued for a short time thereafter, normally around 15 minutes, more or less depending on whether the reaction is proceeding slowly or rapidly.

The following examples illustrate several specific embodiments of my invention.

*Example 1.*—100 parts by weight of a cresol mixture comprising 60 parts of meta-cresol and 40 parts of para-cresol having a boiling range of 201° to 204° C. with over 90% off within 1° (between about 202° and 203°) are mixed with 200 parts by weight of an aqueous 40% by volume (about 37½% by weight) formaldehyde solution, and 0.3 part by weight of NaOH which may be added as a concentrated aqueous solution. When these materials have been thoroughly mixed, the mass is heated to about 95° C. to 100° C. for about one hour, the end point being determined by sampling as previously described. At the end of this time sufficient tartaric acid is added to neutralize the sodium hydroxide present. The material is then heated at around 65° to 68° C. under vacuum until sufficient water has been removed to leave between about 5% and 10% of water based on the weight of the total material. About 15 parts by weight of glycerin may be added and thoroughly mixed with the product while it is still at a temperature around 65° C. The intermediate resin product is poured into molds of the size and shape required for the final product. The material in the molds may be cured by heating at 80° C. for 24 hours and then heating a further period of 48 hours at 90° C. By this process a hard, white, opaque product may be obtained without shrinkage in the mold, and free from defects prevalent in former cresol-formaldehyde condensation products.

If it is desired to produce a clear product, evaporation should be conducted until a water content below about 5% of the resin product is reached. Greater proportions than about 5% yield an opaque product. Proportions greater than about 10% increase the friability of the product and hence should be avoided in preparing resins for most commercial uses. If colored products are desired, a dye or pigment or both, depending upon the depth of color or the transparency required in the product, may be added at the same time that the plasticizer is added or, if it is not affected by conditions of reaction in the initial condensation step, the dye or pigment may be added at any time prior to the final curing step.

Example 2.—50 parts of phenol are mixed with 50 parts of a meta-, para-cresol mixture having a boiling range of 201° to 206° C., at least 90% distilling off below 204° C. 100 parts by weight of the phenol-cresol mixture thus formed are mixed with 200 parts of formaldehyde solution and 0.3 part of sodium hydroxide. The product is heated to a temperature of 90° to 100° C. for about two hours. It is then neutralized by the addition of an organic acid as in Example 1. Water is evaporated off under vacuum until the desired final water content is obtained.

The intermediate product may be mixed with dyes, pigments, plasticizers, etc. and cured. The curing may be effected by heating the resin for 100 hours at a temperature rising gradually from an initial 65° C. up to 95° C., or by the method of Example 1.

Example 3.—100 parts by weight of 1,4,2-xylenol obtained from coal tar and having a boiling range from 210° to 213° C. are mixed with 200 parts by weight of a 40% aqueous formaldehyde solution and 0.2 part by weight of sodium hydroxide. This product is heated to 95° to 100° C for around one hour. The sodium hydroxide is then neutralized, water is evaporated, and the product is cured, with or without the addition of dyes, pigments, or plasticizers, in the same manner as in Example 1 or 2.

Example 4.—100 parts by weight of 1,3,5-xylenol having a boiling range of 217° to 219° C. are substituted for the 1,4,2-xylenol of Example 3. The reaction conditions are otherwise the same as in Example 3. A product substantially similar to that obtained from the 1,4,2-xylenol is thus produced.

It will be evident from the above discussion that phenolic material containing one or more homologues of phenol may be used in accordance with the present invention for the preparation of valuable products. Such phenolic material, containing a substantial proportion of the homologue, may be composed in part of phenol itself. Thus a phenolic material comprising equal quantities of phenol and a homologue thereof may be used. The expression "phenolic material containing a homologue of phenol" as used in the appended claims is intended to cover not only those materials consisting of one or more homologues of phenol but also compositions consisting of such homologues in admixture with phenol.

Mixtures of phenol and its homologues containing a weight ratio of phenol to homologues of less than about 4:1 do not yield satisfactory resins when subjected to condensation conditions normally employed with pure phenol. Such resins, however, respond in an excellent manner to the process of the present invention.

The older type of casting resins, e. g. resins made from phenol and formaldehyde, may be blended with the resins of this invention. This may be accomplished in various ways, but with the general limitation that when larger proportions of sodium hydroxide are used to effect condensation of phenol and formaldehyde, they must not be permitted prematurely to increase the viscosity of the phenol-homologue reaction mixture and thus to interfere with dehydration.

One method of producing these blended resins comprises first partly condensing the phenol and formaldehyde in the presence of more than 2% (say 3% or 4%) NaOH (or equivalent), neutralizing any excess of sodium hydroxide over and above that which will be required to yield the desired NaOH concentration upon the addition of phenol homologue and formaldehyde (not more than 2% of the phenols), adding the desired amount of phenol homologue and formaldehyde and heating to effect condensation to the fusible resin stage.

The blended products also may be prepared by blending a fusible phenol formaldehyde resin with a fusible phenol homologue formaldehyde resin either before or after removal of water therefrom.

I claim:

1. The method of preparing cast resins from a phenolic material of the group consisting of (a) homologs of phenol and (b) mixtures of phenol and homologs of phenol in a ratio below 4:1, which comprises heating to a temperature between about 60° C. and about 100° C. a mixture of said phenolic material and aqueous formaldehyde, in a ratio of not more than one mol phenolic material to two mols formaldehyde, in the absence of added condensing agents other than alkali-metal hydroxide and in the absence of alkali-metal hydroxide in an amount equivalent to more than 2% of sodium hydroxide based on the weight of said phenolic material, until a viscous liquid material is formed which stratifies when cooled to room temperature, neutralizing the viscous liquid material, removing water present, and heat-curing the resultant mass in a suitable mold.

2. The method of preparing cast resins from a mixture of meta and para-cresols, which comprises heating at a temperature between 95° and 100° C. the cresol mixture and aqueous formaldehyde in a ratio between 1 mol cresol : 4 mols formaldehyde and 1 mol cresol : 2 mols formaldehyde in the presence of a condensing agent consisting of alkali-metal hydroxide in an amount equivalent to between 0.1% and 0.3% sodium hydroxide based on the weight of said cresol until a viscous liquid material is formed which stratifies when cooled to room temperature, neutralizing the viscous liquid material, removing water present, and heat curing the resultant mass in a suitable mold.

3. The method of preparing cast resins from xylenol, which comprises heating at a temperature between 95° and 100° C. a mixture of xylenol and aqueous formaldehyde in a ratio of 1 mol xylenol : 4 mols formaldehyde and 1 mol xylenol : 2 mols formaldehyde in the presence of a condensing agent consisting of alkali-metal hydroxide in an amount not exceeding the equivalent of 0.3% of sodium hydroxide based on the weight of the xylenol until a viscous liquid material is formed which stratifies when cooled to room temperature, neutralizing any condensing agent present, removing water present, and heat curing the resultant mass in a suitable mold.

4. The method of preparing from a mixture of meta- and para-cresols a phenolic resin suitable for casting, which comprises heating at a temperature between 95° and 100° C. a mixture of the cresol and aqueous formaldehyde in a ratio between 1 mol cresol : 4 mols formaldehyde and 1 mol cresol : 2 mols formaldehyde in the presence of a condensing agent consisting of alkali-metal hydroxide in an amount equivalent to between 0.1% and 0.3% sodium hydroxide based on the weight of the cresol, until a viscous liquid material is formed which stratifies when cooled to room temperature, neutralizing the viscous liquid material, evaporating water therefrom to reduce the water content to not more than 10% of the weight thereof, and heat curing the resultant mass in a suitable mold.

5. The method of preparing from xylenol a phenolic resin suitable for casting, which comprises heating at a temperature between 95° and 100° C. a mixture of xylenol and aqueous formaldehyde in a ratio between 1 mol xylenol : 4 mols formaldehyde and 1 mol xylenol : 2 mols formaldehyde in the presence of a condensing agent consisting of alkali-metal hydroxide in an amount not exceeding the equivalent of 0.3% of sodium hydroxide based on the weight of the xylenol, until a viscous liquid material is formed which stratifies when cooled to room temperature, neutralizing the viscous liquid material, evaporating water therefrom to reduce the water content to not more than 10% of the weight thereof, and heat curing the resultant mass in a suitable mold.

6. The method of preparing a phenolic resin, which comprises mixing aqueous formaldehyde with a mixture of meta- and para-cresols having a boiling range between about 201° and 204° C. in a ratio between 1 mol cresol : 4 mols formaldehyde and 1 mol cresol : 2 mols formaldehyde, heating the mixture to between 95° and 100° C. in the presence of between 0.1% and 0.3% of sodium hydroxide in aqueous solution until a viscous liquid material is formed which stratifies when cooled to room temperature, neutralizing the viscous liquid material, and evaporating water therefrom to reduce the water content to not more than 10% of the weight thereof, and heating the resultant material in a mold at a temperature between 65° and 95° C. until it becomes a hard, solid product.

7. The method of preparing a phenolic resin, which comprises mixing, in an aldehyde to phenol mol ratio not below 2:1, aqueous formaldehyde with a xylenol mixture having a boiling range of about 210° to 213° C., heating the mixture to between 95° and 100° C. in the presence of a condensing agent consisting of alkali-metal hydroxide in an amount not exceeding the equivalent of 0.3% sodium hydroxide based on the weight of the xylenol until a viscous liquid material is formed which stratifies when cooled to room temperature, neutralizing the viscous liquid material, evaporating water therefrom to reduce the water content to not more than 10% of the weight thereof, and heating the resultant material in a mold at a temperature between 65° and 95° C. until it becomes a hard, solid product.

8. The method of preparing a phenolic resin, which comprises mixing, in an aldehyde to phenol mol ratio not below 2:1, aqueous formaldehyde with a xylenol mixture having a boiling range of about 217° to 219° C., heating the mixture to between 95° and 100° C. in the presence of a condensing agent consisting of alkali-metal hydroxide in an amount not exceeding the equivalent of 0.3% sodium hydroxide based on the weight of the xylenol until a viscous liquid material is formed which stratifies when cooled to room temperature, neutralizing the viscous liquid material, evaporating water therefrom to reduce the water content to not more than 10% of the weight thereof, and heating the resultant material in a mold at a temperature between 65° and 95° C. until it becomes a hard, solid product.

9. The method of preparing from a mixture of phenol and a homologue of phenol a phenolic resin suitable for casting, wherein the weight ratio of phenol to homologue is not more than 4:1, which comprises heating the mixture with aqueous formaldehyde in a ratio of not more than 1 mol of phenols : 2 mols of formaldehyde in the presence of a condensing agent consisting of alkali-metal hydroxide in an amount not exceeding the equivalent of 2% of sodium hydroxide based on the weight of the phenol mixture until a viscous homogeneous liquid condensation product is formed which when cold stratifies and thereupon eliminating water from the condensation product.

10. The method of preparing a phenolic resin suitable for casting from a mixture of phenol and cresol wherein the weight ratio of phenol to cresol is not more than 4:1, which comprises heating the mixture with aqueous formaldehyde in a ratio of not more than 1 mol of phenol mixture : 2 mols formaldehyde in the presence of a condensing agent consisting of alkali-metal hydroxide in an amount not exceeding the equivalent of 2% of sodium hydroxide based on the weight of the phenol mixture until a viscous homogeneous liquid condensation product is formed which when cold stratifies and thereupon eliminating water from the condensation product.

11. The method of preparing a blended phenolic resin from phenol, a homologue of phenol and formaldehyde, which comprises heating a mixture of phenol and formaldehyde in the presence of the equivalent of at least 2% of sodium hydroxide based on the weight of the phenolic material to effect partial condensation, mixing the partially condensed product with a homologue of phenol and aqueous formaldehyde in such proportion as to yield a ratio of not more than 1 mol phenols : 2 mols formaldehyde and heating the mixture in the presence of a condensing agent consisting of alkali-metal hydroxide in an amount not exceeding the equivalent of 2% of sodium hydroxide based on the weight of phenol homologues present until a viscous homogeneous liquid condensation product is formed which when cold stratifies and thereupon eliminating water from the condensation product.

LESLIE T. SUTHERLAND.